United States Patent [19]

Kelman et al.

[11] Patent Number: 5,328,494
[45] Date of Patent: Jul. 12, 1994

[54] METHOD OF FORMING A PREFORM BY PRECOATING GLASS FIBERS PRIOR TO CHOPPING AND PREFORMING

[75] Inventors: Josh Kelman, Dover, N.H.; Robert Hames, York, Me.

[73] Assignee: Davidson Textron Inc., Dover, N.H.

[21] Appl. No.: 865,295

[22] Filed: Apr. 8, 1992

[51] Int. Cl.⁵ .................. C03C 25/02; C03B 23/20
[52] U.S. Cl. .................. 65/60.1; 65/111; 65/4.1; 65/4.4; 264/511; 264/517; 264/121; 264/112
[58] Field of Search .......... 65/111, 4.4, 4.1, 60.3; 264/510, 511, 517, 518, 112, 113, 121

[56] References Cited
U.S. PATENT DOCUMENTS

| | | | |
|---|---|---|---|
| 2,719,350 | 10/1955 | Slayter et al. | 28/1 |
| 3,021,564 | 2/1962 | Morgan et al. | 65/4.4 |
| 3,170,197 | 2/1965 | Brenner | 19/148 |
| 4,199,388 | 4/1980 | Tracy et al. | 264/518 |
| 4,745,028 | 5/1988 | Das et al. | 428/391 |
| 4,994,303 | 2/1991 | Calkins | 427/175 |
| 5,009,821 | 4/1991 | Weaver | 264/22 |
| 5,041,260 | 8/1991 | Johnson et al. | 264/112 |

*Primary Examiner*—W. Gary Jones
*Assistant Examiner*—Steven P. Griffin
*Attorney, Agent, or Firm*—Reising, Ethington, Barnard, Perry & Milton

[57] ABSTRACT

A process for producing a preform (44) includes pretreating roving by submerging it in a tank (18) and cooling the binder (20) on the glass fibers before the glass fibers are chopped. The fibers and solidified binder are then chopped and deposited onto a preform screen (32). Heat is applied to soften the binder that is on the chopped glass fibers and cooled to set the binder and form the preform on the screen.

1 Claim, 1 Drawing Sheet

METHOD OF FORMING A PREFORM BY PRECOATING GLASS FIBERS PRIOR TO CHOPPING AND PREFORMING

TECHNICAL FIELD

This invention relates generally to directed fiber preforming and, more particularly, to an improved process for forming a glass fiber preform.

BACKGROUND OF THE INVENTION

Glass fibers have been commonly incorporated in thermoplastic molded objects and other cured plastics for added strength and durability. The glass fiber is introduced in a mold where resinous plastic is then injected such that the glass fibers become imbedded into the final formed object. It has been found advantageous to form a preform of the final object out of glass fibers and place the preform into the mold. The glass fibers are often chopped and blown onto a preform screen. Immediately following the fiber placement, a binder agent is sprayed on and allowed to cure which sets the fibers in place.

The spraying of liquid binder onto the blown chopped fibers is an inefficient use of the binder material with much of the binder being lost through the foraminous screen and producing gaseous emissions. Secondly, control and even coverage of the binder onto the chopped glass is very difficult to achieve by the use of spray.

What is needed is a directed fiber method that eliminates the use of sprayed liquid binder while improving coverage and control of the binder material in the preform.

SUMMARY OF THE DISCLOSURE

In accordance with one aspect of the invention, a process for manufacturing a preform includes the steps of coating roving such a glass fiber with a liquid binder and subsequently solidifying the liquid binder and chopping the glass roving into chopped fibers. The chopped fibers are then deposited on a preform screen. The deposition of the chopped glass fibers may be accomplished by introducing the chopped fibers into a gaseous stream such as an air flow and blown onto the preform screen.

The chopped fibers may be retained on the preform screen by use of a suction fan creating a vacuum draw through the preform screen and providing a retaining suction force on the chopped fibers onto the preform screen.

The preform is then cured by tackifying the binder that is on the chopped fibers on the preform screen to bind adjacent chopped fibers together and curing (or resolidifying) said binder while on the preform to cure said preform.

DETAILED DESCRIPTION OF THE PREFERRED EMBODIMENT

Figure 1:
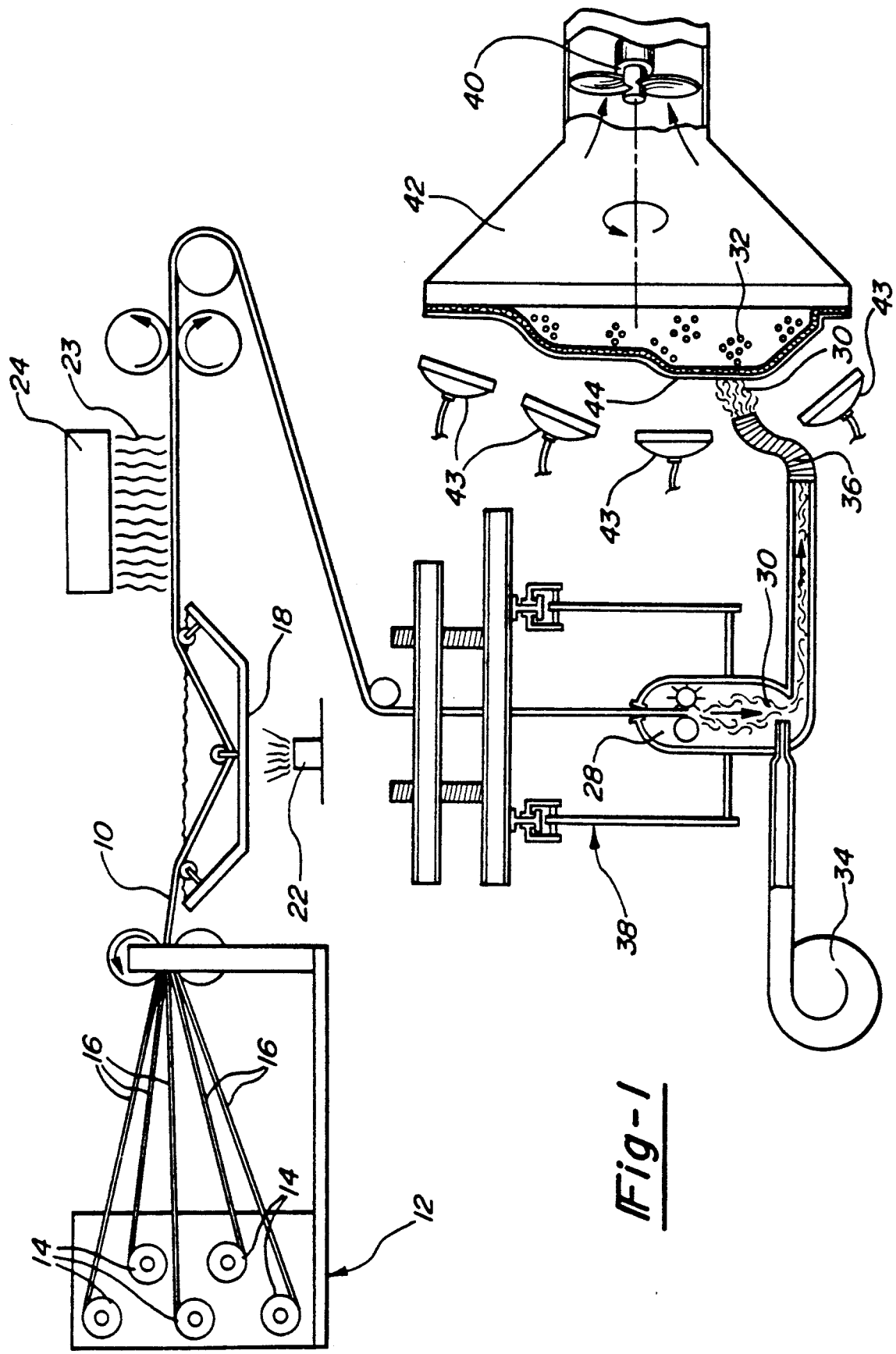
FIG. 1 is an elevational and schematic view of directed fiber preforming line in accordance with the invention.

Referring now to the drawing, a supply of glass roving 10 is produced from a roll stand 12 of spools 14 of glass fiber 16. The glass roving used may be a commercially available roving such as one sold under the brand name PPG-5542. The glass roving is transferred into a tank 18 of hot melt binder 20 thereby to be submerged therein and drawn therethrough so as to cause the roving to be fully dipped within the hot melt binder 20 contained within the tank 18 as shown in FIG. 1. The hot melt binder is maintained in a liquid state within tank 18 by heater 22. The glass roving 10 is then removed from the tank 18 with a coating of the binder thereon. The liquid binder is solidified by cooling of the roving 10 and binder 20 by the application of chilled air 23 from source 24. The binder is preferably a thermoplastic material that melts into a liquid upon application of heat and solidifies upon cooling.

The coated glass roving is then transferred to a glass fiber chopper 28 to form chopped glass fibers 30 coated with solidified binder. The same roving 10 continuously extends from the tank 18 to the chopper 28 which is mounted in proximity to the blower 34 to form a continuous process. The chopped fibers 30 are then blown onto a preform screen 32. The air or other gaseous flow is produced by blower 34. The chopped fibers are selectively directed by hose 36 and by use of a gantry 38 that moves hose 36 with respect to the preform screen 32.

The preform screen 32 has a foraminous section that is contoured into a desired shape and is operably connected to duct work 42 that has a suction fan 40 mounted therein. The suction fan 40 produces a vacuum draw through the foraminous screen 32 to retain the chopped fibers 30 thereto.

The preform 44 that is formed on preform screen 32 is then cured. Heat from heaters 42 is applied to the chopped fibers 30 on preform screen 32 to soften the binder to make it tacky and cause adjacent fibers that are in contact to each other to bind together. The screen 32 may be moved on a multi-station line such that the heat is applied at a different station than the station that deposits the glass fibers. The heat may be applied by heat lamps 43, heated air, or other conventional heating methods. The preform is then allowed to cool by use of chilled air or deactuation of heat lamps 43 such that the binder is cured and solidified to form a cured preform 44.

In this fashion, a glass roving is uniformly covered with binder before the roving is chopped into chopped fibers. An efficient use of thermal plastic binder or thermoset binder is provided. The pretreatment of the glass roving eliminates the use of spray at the preform screen. The elimination of spray promotes the reduction of emissions from the binder.

Other variations and modifications of the present invention are possible without departing from its scope and spirit as defined by the appended claims.

The embodiments in which an exclusive property or privilege is claimed are defined as follows:

1. A process of manufacturing a preform comprising the steps of:
   providing an unchopped glass fiber roving from a supply source, into a tank, through cooling air from a cooling source and to a chopper, said unchopped glass fiber roving is continuously and axially moved along its length;
   coating the unchopped glass fiber roving with a curable liquid binder material along its length as it axially moves into a tank of liquified thermoplastic binder and submerging the roving in the binder and subsequently withdrawing said roving from said tank;

solidifying the curable liquid binder material coating on said unchopped glass fiber roving as it axially moves through said cooling air;

thereafter chopping the binder coated glass fiber roving into binder coated chopped fibers as it axially moves through said chopper;

providing a gaseous flow and a preform screen;

combining said binder coated chopped fibers with said gaseous flow and directing said chopper fibers from said chopper and said gaseous flow against the preform screen for depositing the binder coated chopped fibers onto the preform screen;

retaining said binder coated chopped fibers on said preform screen to form a preform shaped to the form of said preform screen; and curing said preform by applying heat to said binder coated chopped fibers to tackify said binder material on said binder coated chopped fibers after deposition of said binder coated chopped fibers onto said preform screen, thereafter cooling said binder coated chopped fibers to solidify said binder material to bind the binder coated chopped fibers together to form a cured preform on said preform screen.

* * * * *